United States Patent [19]

Rough, Sr.

[11] 4,353,726

[45] Oct. 12, 1982

[54] METHOD AND APPARATUS FOR PREHEATING PULVEROUS MATERIALS PRIOR TO THEIR INTRODUCTION INTO A MELTING FURNACE

[75] Inventor: Robert R. Rough, Sr., Toledo, Ohio

[73] Assignee: Owens-Illinois, Inc., Toledo, Ohio

[21] Appl. No.: 255,006

[22] Filed: Apr. 17, 1981

[51] Int. Cl.³ .............................................. C03B 3/00
[52] U.S. Cl. ......................................... 65/27; 65/134; 65/335; 165/3; 165/104.18; 165/111; 165/112
[58] Field of Search ............... 65/27, 335, 134; 165/3, 165/104.18, 111, 112

[56] References Cited

U.S. PATENT DOCUMENTS

| | | | |
|---|---|---|---|
| 3,880,639 | 4/1975 | Bodner et al. | 65/134 |
| 4,184,861 | 1/1980 | Erickson et al. | 65/27 |
| 4,248,616 | 2/1981 | Seng et al. | 65/335 |
| 4,295,519 | 10/1981 | Bellaff | 165/111 X |
| 4,306,899 | 12/1981 | Richards | 65/27 |
| 4,310,342 | 1/1982 | Richards | 65/27 |

FOREIGN PATENT DOCUMENTS 658387  4/1979  U.S.S.R. ............................... 65/335

Primary Examiner—Arthur D. Kellogg
Attorney, Agent, or Firm—E. J. Holler; M. E. Click; D. H. Wilson

[57] ABSTRACT

The present invention relates to method and apparatus for preheating pulverous materials, such as glass batch constituents, prior to their introduction into a melting furnace to increase the efficiency and output of the melting installation. The pulverous materials are passed downwardly by gravity through a shell and tube preheater including an interior exhaust chamber to vent the contained moisture from the heated pulverous material. The venting prevents moisture condensation and buildup of the pulverous material within the tubes and batch materials, especially in cooler areas, which can cause tube pluggage. The subject invention is of particular utility to the glass industry and especially glass melting furnaces, but is also applicable to other types of furnaces.

18 Claims, 2 Drawing Figures

METHOD AND APPARATUS FOR PREHEATING PULVEROUS MATERIALS PRIOR TO THEIR INTRODUCTION INTO A MELTING FURNACE

CROSS-REFERENCE TO RELATED APPLICATION

This application is related to a continuation-in-part application of pending U.S. patent application Ser. No. 215,478, filed Dec. 11, 1980 now U.S. Pat. No. 4,303,434, based on earlier-filed application Ser. No. 185,117, filed Sept. 8, 1980 now abandoned, in the name of the same inventor and having the same title, which application is assigned to the same common assignee as the present application.

BACKGROUND OF THE INVENTION

1. Field of the Invention

Various types of manufacturing processes are known in which the starting materials are introduced into the furnace while cold or at ambient temperature by the use of either continuously or discontinuously operating devices. Such devices are frequently protected by a hydraulic or other cooling apparatus which absorbs the heat from the furnace and additionally intensifies the cooling of the materials introduced into the furnace. In these methods, and especially in melting glass, the starting materials are subjected to heating only after they have been introduced into the furnace where they receive, at high temperature, the quantities of heat necessary for heating them, for ensuring completion of the endothermic reactions, and for imparting thereto sufficient fluidity to ensure homogenization and refining of the resultant molten glass mass. It has been observed in glass making that the greater part of the heat delivered to the starting material is directed to increasing the temperature of the starting materials rather than to producing the melting reactions. In most known methods, the starting materials are deposited on top of the molten bath and are subjected to radiation from the flames circulation with great turbulence above them. Since the newly-introduced materials are poor conductors of heat, the heat exchange is poor, which appreciably slows the melting process.

The present invention especially relates to increasing the efficiency and output of glass melting installations, and provides means whereby a glass melting furnace may be operated continuously and uniformly at full capacity or beyond, if desired. Apparatus is provided for preheating the thoroughly-mixed, glass-forming ingredients before the same are supplied to the melting furnace, and preferably utilizing the heat of the waste gases from the melting furnace in such preheating of the glass mixture, and causing continuous passage of the glass mixture by gravity through the preheater for subsequent delivery to the melting furnace.

This invention comprises an improved process and means for practicing the process to accomplish the aforesaid objects, and in the provision of an improved arrangement of apparatus for preheating the glass batch mixture and for utilizing waste gases from glass melting furnaces, or preheated hot air from such furnaces, as more fully set forth in the following specification, and as particularly pointed out in the appended claims.

The provision of the preheater for the glass-making mixture enables the utilization, for heating the same, of the heat in the waste gases from the melting furnace which otherwise would go to waste up the stack. While the use of hot waste gases is preferred to operate the preheater, preheated air from the furnace heat-recovery "checkers" area which is used for combustion, or a supplemental heat source such as an oil or gas burner, alone or in combination, may also be used to heat the air or waste gases for operating the preheater. Also, atmospheric air may be heated to operate the batch preheater. The provision of the preheater, continuously delivering glass batch mixture at a proper predetermined elevated temperature, to a melting furnace, which is used with either continuous or batch processes, permits more uniform operation of the furnace with a significant increase in efficiency of operation and in the output of the furnace.

2. Description of Prior Art

There is a considerable number of earlier-issued U.S. patents which deal with initially preheating the glass batch mixture prior to its delivery into the glass furnace. U.S. Pat. No. 3,607,170 to Malesak discloses method and apparatus in which the glass mixture is preheated in a nonoxidizing atmosphere while being advanced in a given direction through a preheating zone of a tunnel kiln. A mixture of glass powder and foaming agent is delivered into a hopper having a series of tubes through which the mixture passes.

U.S. Pat. No. 3,172,648 to Brichard relates to preheating of pulverous materials in which the quantity and rate of flow of the fumes in the preheating zone are in direct contact with the glass forming ingredients, such contact causing an entrainment of dust in the emitting fumes.

U.S. Pat. No. 4,045,197 to Tsai et al relates to apparatus and method for recovering the waste heat from the exhaust gases of a glass melting furnace which is transferred by heat pipes to an enclosure in which incoming glass batch materials are preheated prior to being fed to a furnace for melting. The heat pipes contain metallic sodium as the working fluid.

U.S. Pat. No. 3,788,832, to Nesbitt et al, and U.S. Pat. No. 3,880,639, to Bodner et al, owned by the same common assignee as the present application, both relate to the preheating of agglomerated glass batch materials by direct contact with a gaseous effluent being exhausted from a glass melting furnace.

U.S. Pat. No. 3,185,554 to Sweo et al relates to a method of preheating glass batch materials by independent heating means other than exhausted effluent so that there is no unpredictable relationship between varying amounts of waste heat and the amount of heat provided for preheating unmelted batch materials.

A considerable number of other patents relates to the direct heat exchange between incoming batch materials and exhaust gases from a glass melting furnace. These patents are: U.S. Pat. No. 3,607,190 to Penberthy, U.S. Pat. No. 4,026,691—Lovett, U.S. Pat. No. 3,526,492—Motsch, U.S. Pat. No. 3,350,213—Peyches, U.S. Pat. No. 1,543,770—Hilbert, U.S. Pat. No. 3,753,743—Kukuda, U.S. Pat. No. 1,610,377—Hitner, and U.S. Pat. No. 4,099,953—Rondeaux. Many techniques have been disclosed in the patent literature for direct and indirect heat exchange between hot exhaust gases from a glass melting furnace and incoming batch materials; however, none is capable of achieving the results attainable by the present invention.

DESCRIPTION OF THE PREFERRED EMBODIMENT

Figure 1:
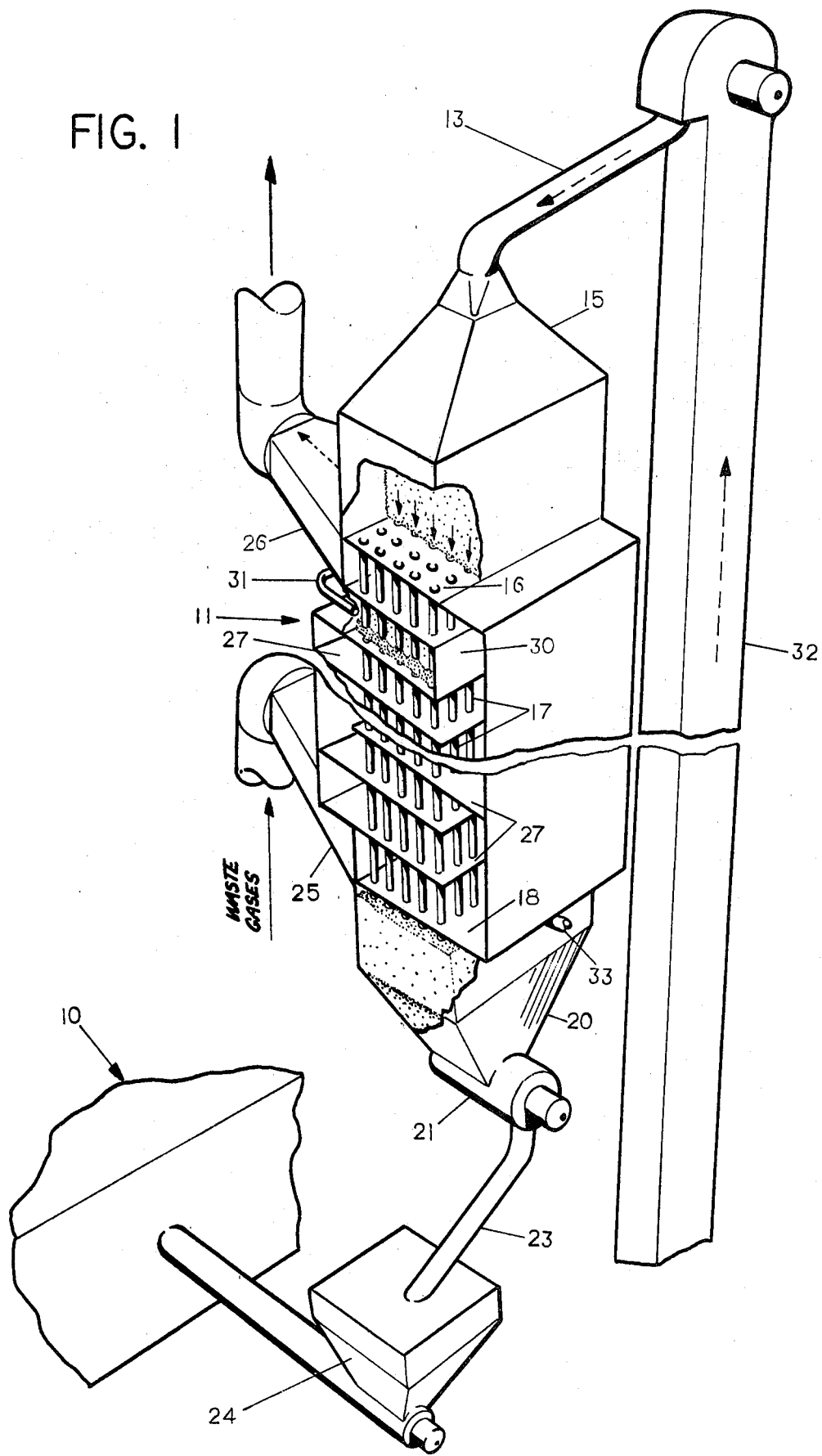
FIG. 1 is a perspective view partially broken away of the glass batch preheater apparatus for practicing the present invention.
Figure 2:
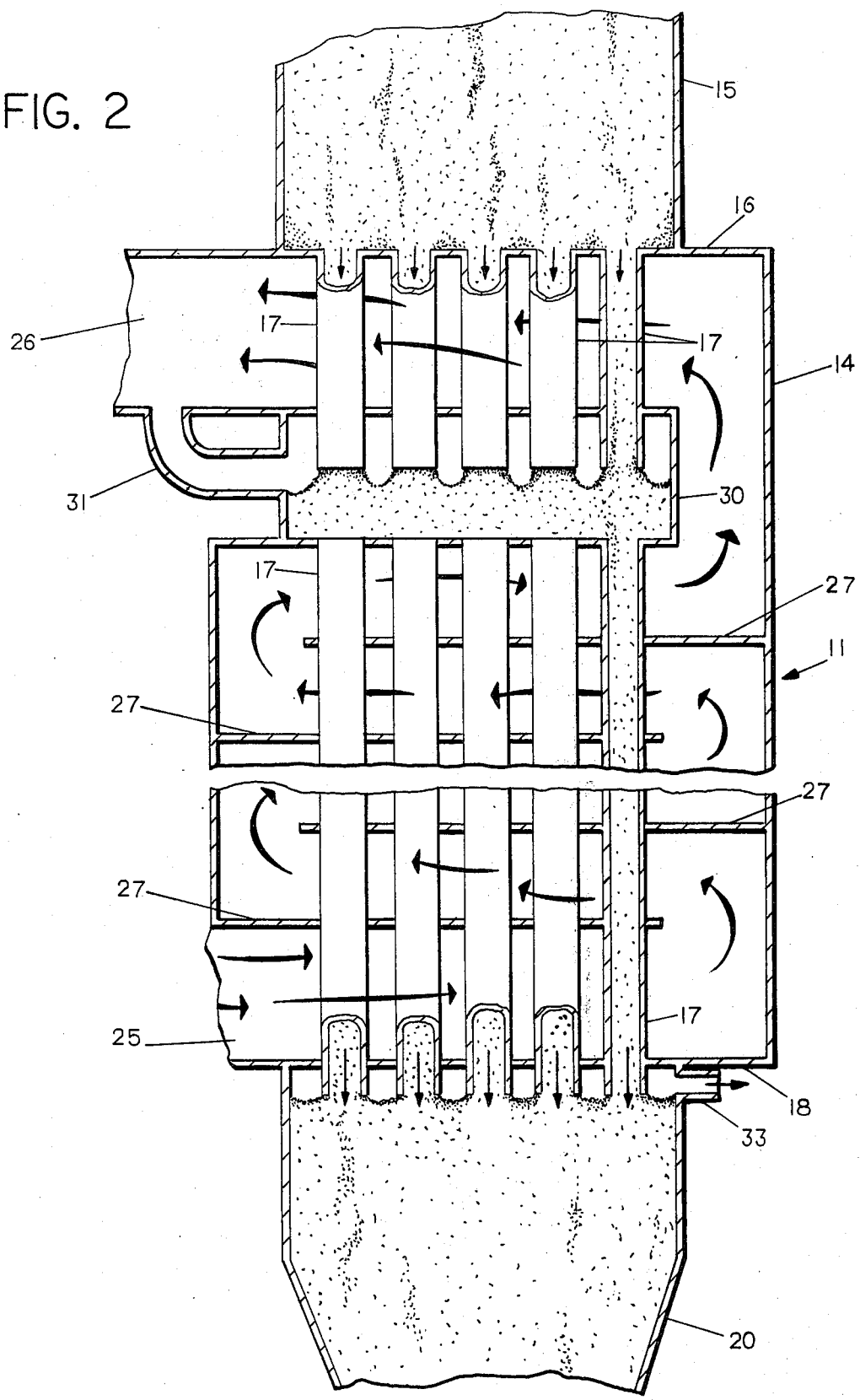
FIG. 2 is an enlarged fragmentary vertical sectional view of the preheater apparatus as shown in FIG. 1.

Referring to the drawings, a glass melting furnace 10 of the regenerative type having a bottom of fire brick, whereon the melt of glass forming ingredients is deposited, is indicated schematically in FIG. 1. Gas and air are normally mixed and burned in the furnace above the glass forming materials, and the resulting heat melts the mixed materials to a mass of molten glass, which is delivered or worked from one end following refining. The regenerative or heat-accumulating chamber or passageways are normally located beneath the furnace melting chamber.

The air is usually passed through the regenerative passages beneath the furnace bottom for preheating and through side ports which lead into the furnace melting chamber where it is mixed with fuel which is burned to melt the glass forming materials. The hot waste gases are then passed through opposite side ports and then through the regenerative passages for heat recovery, and then to flue ducts and a discharge stack. After a limited period of operation in this manner, the path of travel of the incoming gas and air is switched, by suitable dampers and timers, so that the air then enters the melting chamber from opposite ports, the hot waste gases then passing off through opposite flue passages and ducts to the stack. By the alternate use of regenerative passage for incoming combustion air and outgoing hot waste gases, the incoming air is preheated by the bricks of the regenerative passages which have been heated by the escaping flue gases which previously passed therethrough. All of the foregoing description pertains to well known glass furnace construction and is merely set forth by way of example. The waste gases from the furnace, the preheated combustion air from the furnace, or supplementary atmospheric air which has been suitably preheated, may alternately be employed to operate the batch preheater.

In accordance with a preferred embodiment of the present invention, a preheater 11 is mounted adjacent to the batch feeding end of the glass furnace at an elevation higher than the normal elevation of the furnace batch chargers. The glass forming ingredients in suitably intermixed moisture-containing condition are delivered to the top of the preheater 11 by any suitable means such as a vertical elevator 32. The vertical elevator may consist of any endless chain or bucket-type arrangement of standard construction, capable of taking the glass forming mixture from a pile or hopper and delivering it into a chute 13 at its upper end through which it passes into the top of the preheater 11. The glass forming mixture comprises the normal intermixed batch constituents with moisture ranging from about ¼ to 1 percent and may or may not contain broken cullet for forming the glass melt. The cullet, when present, normally has a size ranging from less than one-half inch U.S. mesh size, the smaller sizes being preferred for passage through the preheater to prevent bridging within or over the tubes.

The preheater typically comprises a vertical chamber 14 having a rectangular cross-section with a frusto-pyramidal top cover 15. The main mass of glass batch is delivered through a chute leading into the bottom area of vertical elevator 32 for delivery to the top of preheater 11. Between the enclosed top cover and the main body portion of the preheater is located an interior horizontal upper plate 16 into which a plurality of interrupted open-ended tubes 17 are headed at their upper ends. The tubes are mounted in spaced-apart array in parallel, vertical alignment for passage of the glass batch therethrough. The tubes 17 are headed into and out of a horizontal exhaust chamber 30 disposed within an upper region of the preheater 11. The tubes preferably are aligned in axial vertical alignment within the uppermost and lower region of the preheater. The tubes are interrupted or discontinuous within moisture exhaust chamber 30 so that the glass batch may flow freely and unrestricted in such area.

The glass batch is primarily heated in the lower regions of the preheater and becomes progressively hotter during its downward passage. The glass batch in the exhaust chamber is preferably maintained at a temperature above that boiling point temperature of water so that the moisture in vapor form can be vented therefrom. At least one vent pipe 31 leads from the exhaust chamber either into the discharging hot gas stream or a separate condensation chamber or the atmosphere. The moisture exhaust chamber is preferably located about 1/5 or 1/6 of the way down the preheater where nearly all of the contained moisture in the batch is removed.

The tubes 17 preferably have about a 4 inch outside diameter and extend throughout the central major portion of the preheater downwardly from the exhaust chamber to an interior horizontal lower plate 18 into which they are similarly headed. Thus, the portions of the preheater above and below the exhaust chamber comprises a shell and tube arrangement. Tubes having about the stated dimension are capable of handling batch, including broken cullet, while tubes of about 2 inch internal diameter are able to handle cullet-free batch. The lower open ends of the tubes extend a short distance below plate 18 to allow free discharge of the glass batch therefrom. The space around the downwardly-projecting tube ends normally remains open above the collected batch emitting from the tubes. The number of tubes and dimensions of the preheater will depend upon the size of the glass melting furnace with which it is employed, and the desired conditions of use. The tubes are mounted on about 6 to 8 inch centers, for example, where 4 inch outside diameter tubes are employed, the corner tubes usually being omitted where the preheater has a rectangular or square horizontal cross-section. The tubes are preferably comprised of carbon or stainless steel for long-term use without rusting or corrosion, and are normally equi-spaced for optimum particulate batch flow.

The lower region of the preheater comprises a truncated wedge-shaped bottom hopper 20 and feed screw 21 into which the open-ended tubes 17 deliver the heated glass batch. The bottom hopper terminates at its lower extremity into a screw-driven batch removal chamber which interconnects with a valve member. The valve member has an exit portion for directing the heated glass batch through a chute 23 to a batch charger 24. The batch charger is capable of delivering the heated glass into the furnace 10 through the screw-driven feed member or other means as known in the art.

Immediately above the bottom interior header member 18 of the preheater, an incoming waste gas duct 25 is mounted for delivering hot waste gases into a lower region of the preheater. The duct is designed to open out into a relatively-flat, wide duct inlet having a width comparable to the preheater for introducing the hot gases across its full width.

Immediately below the upper interior header member 16 of the preheater is mounted an outgoing waste gas duct 26 for removing hot waste gases from the preheater upper region. The duct consists of a relatively-flat, wide duct outlet having a width comparable to the preheater for removing the hot gases across its full width.

A plurality of flat baffle plates 27 is mounted in spaced-apart, staggered relation within the preheater below the exhaust chamber between the upper and lower interior header plates 16 and 18. The baffle plates 27 have openings therein through which the tubes 17 extend their upper and lower extremities. The baffle plates are able to direct the upwardly coursing hot waste gases in a circuitous path around the tubes to provide turbulence to the gases and thereby improve indirect heat transfer to the tubes and the glass batch moving downwardly by gravity therewithin.

The batch mixture passes gradually and continuously through the preheater by gravity from top to bottom. The moisture normally found in the glass batch in an amount ranging from 0.1 to 1 percent by weight is vaporized due to the batch heating within the lower tubes. The moisture in the batch in the lower tubes beneath exhaust chamber 30 is driven upwardly into the exhaust chamber from which it is discharged. Also, the moisture in the batch in the upper tubes is conducted in vapor form into the moisture exhaust chamber. The moisture exhaust chamber may have a vertical height ranging from about 2 to 10 inches, although it may be as high as about 12 inches internally for vapor removal. Thus, its condensation or collection in the upper cooler areas of the tubes is prevented. The batch is then delivered, uniformly heated, moisture-free and well mixed, from the bottom hopper region of the preheater to the glass batch charger 24 of the furnace. The glass batch is thus advanced slowly and continuously downwardly to the furnace area for melting.

The glass batch in the preheater is indirectly heated by the hot waste gases which are taken from the furnace prior to their arrival at the stack. As shown, the hot gases enter the bottom region of the preheater near the lower end of the tubes and immediately above lower plate 18, the gases then passing in a serpentine path around the baffle plates 27 and exhaust chamber to the top of the preheater at the underside of upper plate 16, and then escaping from the preheater through outgoing duct 26. Inlet and outlet ducts 25 and 26 may be provided with dampers so that the flow of hot gases through the preheater may be accurately controlled. The gases passing in countercurrent flow to the descending glass forming batch materials, within the tubes, move between and around the tubes and their exhaust chamber heating the same, and the contained glass batch therewithin indirectly. Further, the hottest gases thus act upon the hottest portion of the glass forming constituents in the lower area of the preheater, adding a further increment to their residual heat immediately before passing into the melting furnace. As stated hereabove, the hot gas stream may be comprised of waste gases from the furnace heating zone, or preheated combustion air from the furnace checkers area, or preheated outside air which has been supplementally heated prior to delivery to the batch preheater.

By proper design of the upper and lower hopper sections of the preheater, such areas having generally frusto-pyramidal or truncated wedge shapes, relatively-uniform and smooth flow of the batch materials by gravity through the entire vertical height of the preheater is attained. Thus, flow rates of the batch through all of the heat exchanger tubes, to maintain the same virtually-full at all times, is obtained for uniform amounts of preheating. The preferred form of construction of the preheater involves having a straight section at an upper region above the tubes, and a straight section with rounded corners connected to a wedge-shaped hopper with rounded corners at the bottom region beneath the tube lower ends for continuous movement of the hot, dry batch. A sufficient heat is thereby maintained over the tubes to assure such gravity flow without mechanically-aided assist, along with a suitable feeder unit to remove preheated material from the bottom of the hopper.

The contained moisture in the glass batch is forced into the exhaust chamber during gravity flow of the batch to prevent its collection and condensation within an upper region of the tubes. Such condensation can cause a wetting of the batch and pluggage of the tubes, thereby causing either a shutdown of a portion or all of the tubes, or very inefficient operation of the preheater. The moisture within the batch in the tubes is driven to the intermediate region of the preheater from which area it can be expelled. As stated, at least one vent pipe or tube 31 is mounted within a sidewall of the exhaust chamber of the preheater for venting the moisture and water vapor to the gas exhaust duct or the atmosphere. A second vent pipe 33 may be located in the sidewall of the bottom hopper 20 for further elimination of moisture in vapor form.

Through proper and thorough mixing of the newly-incoming cold batch fraction, uniform and continuous operation of the preheater apparatus can be practiced. This can be accomplished when the temperature conditions, internal flow of batch, and the exterior flow of water vapor are properly adjusted. Such uniform operation permits the maintenance of substantially-constant conditions within the preheater for delivering significantly-hotter glass batch to the furnace, greatly increasing the furnace efficiency.

The temperature of the stack gases entering the preheater will vary with furnace conditions, of course; however, they will normally be from 900° F. to 1100° F., and will frequently average about 1000° F. for substantial periods. The gases leaving the preheater will range from about 400° F. to 600° F., averaging about 500° F.

Obviously, additional heating means for the preheater may be provided, if desired, although the furnace waste gases are usually fully adequate for most economical operation. The waste gases, or hot air, normally enter the preheater at a temperature ranging from about 900° F. to 1100° F., after leaving the furnace combustion or checkers area. As stated, preheated combustion air which has passed through the furnace heat-recovery area can also be used to heat the batch in the preheater, may be used.

The glass batch mixture usually enters the top of the preheater at about ambient temperature and leaves the preheater at the valve member 22 having a temperature ranging from about 700° F. to 1000° F., for delivery to the furnace. Such temperatures are possible with a glass furnace which is capable of manufacturing about 100 to 300 tons per day of product.

The present invention is capable of continuous operation when downward movement of the glass batch in the cooler upper region of the preheater is supplemented with continuous moisture removal in the proper region. The residual moisture within the batch must not be permitted to condense within the tubes, or within the top cover member 15 of the preheater, to cause pluggage of some or all of the tubes, or bridging of the normally-flowable mass. Such pluggage prevents optimum operation of the preheater and cannot be tolerated in longterm operation. By keeping all interior surfaces of the exhaust chamber of the preheater contacted by the cooler batch above the boiling point temperature of water. The water contained in the batch being driven exteriorly, adherance to such contacted surfaces can thus be prevented and smooth gravity flow of the batch maintained.

The present invention is not limited to the interaction of one preheater to one melting furnace, the former being connected with hot gases leading to one stack. If desired, one preheater may be connected to serve a number of melting furnaces, or a number of preheaters may be associated with one furnace, and the waste gases emitting therefrom.

Various modifications may be resorted to within the spirit and scope of the appended claims.

I claim:

1. The process of preheating glass batch prior to its delivery to a glass melting furnace comprising the steps of introducing the fully-intermixed, moisture-containing, glass batch constituents into the upper region of a tubular heat exchanger, allowing the glass batch to flow downwardly by gravity through a plurality of interrupted lengthy open-ended tubes of said heat exchanger, said tubes being interrupted within an enclosed exhaust chamber located within an upper region of said heat exchanger, passing hot gases upwardly through said heat exchanger around said open-ended tubes and said exhaust chamber to heat the glass batch contained therein by countercurrent indirect heat transfer, venting the contained moisture from within said glass batch during its passage through said exhaust chamber, and delivering the essentially moisture-free heated glass batch from the bottom of said heat exchanger into the glass melting furnace.

2. The process in accordance with claim 1, wherein hot gases from said glass melting furnace are directed upwardly in a circuitous countercurrent path around said open-ended tubes and said exhaust chamber by a series of spaced-apart baffles to achieve greater indirect heat transfer.

3. The process in accordance with claim 1, including the step of maintaining the glass batch within the open-ended tubes below said exhaust chamber above the boiling point temperature of the residual moisture in said glass batch.

4. The process in accordance with claim 1, wherein said glass batch is heated to a temperature ranging from about 700° F. to 1000° F. prior to its delivery to said glass-melting furnace.

5. The process in accordance with claim 1, wherein the said glass batch is passed through the interrupted lengthy open-ended tubes of said heat-exchanger having uniform dimensions of about 4 inch internal diameter.

6. The process in accordance with claim 1, wherein the hot waste gases from the glass melting furnace are passed upwardly through the said heat exchanger.

7. The process in accordance with claim 1, wherein the preheated combustion air from the glass melting furnace is passed upwardly through the said heat exchanger.

8. The process in accordance with claim 1, wherein the said tubes are open-ended both above and below said exhaust chamber and in generally vertical alignment for smooth downward flow of said glass batch.

9. The process in accordance with claim 1, wherein the temperature of said glass batch in said exhaust chamber is maintained above the condensation temperature of the contained moisture in vapor form in said glass batch.

10. The process of preheating glass batch constituents prior to delivery to a glass melting furnace comprising the steps of introducing the fully-intermixed moisture-containing glass batch constituents into the upper region of a tubular heat-exchanger, allowing the glass batch constituents to flow downwardly by gravity through a plurality of interrupted lengthy open-ended tubes of said heat-exchanger, said tubes being interrupted and headed into an enclosed exhaust chamber disposed within an upper region of said heat-exchanger, passing hot gases upwardly through said heat-exchanger around said open-ended tubes and said exhaust chamber to heat the glass batch constituents contained therein by countercurrent indirect heat transfer, venting the contained moisture in vapor form from within said glass batch constituents during their passage through said exhaust chamber, maintaining the said glass batch constituents within said exhaust chamber above the boiling point temperature of water, and delivering the essentially moisture-free heated glass batch constituents from the bottom of said heat exchanger on a continuous basis into the glass melting furnace.

11. Combined apparatus for preheating glass furnace batch comprising an elongated vertically-mounted heat-exchanger having a plurality of interrupted lengthy open-ended tubes extending vertically throughout a major central portion of its height, means for delivering glass batch in fully-intermixed moisture-containing condition to an upper region of said heat-exchanger for its passage by gravity through said open-ended tubes, an exhaust chamber disposed in an upper region of said heat-exchanger into which said tubes are interrupted and headed, means for introducing hot gases from said glass furnace into a lower region of said heat-exchanger to circulate upwardly between said open-ended tubes and around said exhaust chamber, baffle means mounted around said tubes to direct said hot gases in a circuitous path around said tubes and out of contact with said glass batch for countercurrent indirect heat transfer, venting means leading from said exhaust chamber to separate the contained moisture in vapor form from said glass batch, and means for delivering the said glass batch continuously to said glass furnace in essentially moisture-free preheated condition.

12. Combined apparatus in accordance with claim 11, wherein said means for introducing said hot gases into a lower region of said heat-exchanger comprises a hollow duct leading from the furnace combustion chamber to said heat-exchanger.

13. Combined apparatus in accordance with claim 11, wherein said baffle means comprises a series of baffle plates extending in staggered spaced-apart horizontal relation as a vertical array within said heat-exchanger mounted around said open-ended tubes and below said exhaust chamber.

14. Combined apparatus in accordance with claim 11, wherein said open-ended tubes are interrupted within said exhaust chamber for a vertical height not in excess of about 12 inches.

15. Combined apparatus in accordance with claim 11, wherein said open-ended tubes have generally uniform length and a uniform internal diameter of about 2 inches, and are disposed in generally equi-spaced arrangement.

16. Combined apparatus in accordance with claim 11, wherein said venting means comprises at least one vent pipe leading from said exhaust chamber.

17. Combined apparatus in accordance with claim 11, wherein said exhaust chamber has substantially the same number of open-ended equi-spaced tubes leading into its upper and lower areas.

18. Combined apparatus in accordance with claim 11, wherein said venting means leading from said exhaust chamber is directed into the hot gases exiting from said heat exchanger.